United States Patent
Gao et al.

(10) Patent No.: US 10,592,366 B2
(45) Date of Patent: Mar. 17, 2020

(54) METHOD AND DEVICE FOR REBUILDING RAID

(71) Applicant: EMC IP Holding Company LLC, Hopkinton, MA (US)

(72) Inventors: Jian Gao, Beijing (CN); Geng Han, Beijing (CN); Jibing Dong, Beijing (CN); Lifeng Yang, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 29 days.

(21) Appl. No.: 15/846,762

(22) Filed: Dec. 19, 2017

(65) Prior Publication Data
US 2018/0210799 A1    Jul. 26, 2018

(30) Foreign Application Priority Data

Dec. 21, 2016 (CN) .......................... 2016 1 1194062

(51) Int. Cl.
  *G06F 11/00* (2006.01)
  *G06F 11/20* (2006.01)
  *G06F 11/10* (2006.01)
  *G06F 11/16* (2006.01)

(52) U.S. Cl.
CPC ...... *G06F 11/2094* (2013.01); *G06F 11/1084* (2013.01); *G06F 11/1088* (2013.01); *G06F 11/1092* (2013.01); *G06F 11/1662* (2013.01)

(58) Field of Classification Search
CPC ............. G06F 11/1076; G06F 11/1084; G06F 11/1088; G06F 11/1092; G06F 11/2056
See application file for complete search history.

(56) References Cited

U.S. PATENT DOCUMENTS

| | | | | |
|---|---|---|---|---|
| 7,664,913 B2 * | 2/2010 | Cassell | ................ | G06F 3/0605 711/114 |
| 7,962,779 B2 * | 6/2011 | Patel | .................. | G06F 11/1076 714/4.12 |
| 8,065,558 B2 * | 11/2011 | Zwisler | ............... | G06F 11/2094 714/6.2 |
| 8,086,893 B1 * | 12/2011 | MacFarland | ........ | G06F 11/1088 714/3 |
| 8,099,623 B1 * | 1/2012 | Li | ....................... | G06F 11/1084 714/6.22 |
| 8,874,494 B1 | 10/2014 | Evans | | |

(Continued)

OTHER PUBLICATIONS

Foley, Robert, et al.; "Selective RAID Repair Based on Content Mapping," U.S. Appl. No. 15/281,951, filed Sep. 30, 2016.

*Primary Examiner* — Elmira Mehrmanesh
(74) *Attorney, Agent, or Firm* — BainwoodHuang

(57) ABSTRACT

Embodiments of the present disclosure provide a method and device for RAID rebuilding. In some embodiments, there is provided a computer-implemented method. The method comprises: determining a spare redundant array of independent disks (RAID) group with spare capacity from a plurality of disks included in at least one RAID group of a storage pool; building spare logic units from the spare RAID group; and in response to a RAID group of the at least one RAID group of the storage pool being in a degradation state, rebuilding a failed disk in a degraded RAID group using the spare logic units.

18 Claims, 10 Drawing Sheets

(56) References Cited

U.S. PATENT DOCUMENTS

| | | | | |
|---|---|---|---|---|
| 8,943,359 B2 * | 1/2015 | Tiwari | ............... | G06F 11/2094 |
| | | | | 714/6.1 |
| 8,972,778 B2 * | 3/2015 | Kulkarni | ............. | G06F 11/2094 |
| | | | | 714/6.22 |
| 9,690,660 B1 | 6/2017 | Robins et al. | | |
| 9,804,939 B1 | 10/2017 | Bono et al. | | |
| 9,921,912 B1 | 3/2018 | Vankamamidi et al. | | |
| 10,089,026 B1 * | 10/2018 | Puhov | .................. | G06F 3/0619 |
| 10,210,045 B1 | 2/2019 | Gao et al. | | |
| 10,365,983 B1 | 7/2019 | Foley et al. | | |
| 2010/0169575 A1 * | 7/2010 | Masaki | ............... | G06F 11/1092 |
| | | | | 711/114 |
| 2010/0251012 A1 * | 9/2010 | Zwisler | ............... | G06F 11/1092 |
| | | | | 714/6.32 |
| 2013/0227345 A1 * | 8/2013 | Gadekar | ............... | G06F 11/1092 |
| | | | | 714/6.22 |
| 2016/0210211 A1 * | 7/2016 | Bartlett | ............... | G06F 11/2094 |

\* cited by examiner

METHOD AND DEVICE FOR REBUILDING RAID

RELATED APPLICATIONS

This application claim priority from Chinese Patent Application Number CN201611194062.6, filed on Dec. 21, 2016 at the State Intellectual Property Office, China, titled "METHOD AND DEVICE FOR REBUILDING RAID" the contents of which is herein incorporated by reference in its entirety.

FIELD

Embodiments of the present disclosure generally relate to data storage, and more specifically, to a method for rebuilding redundant array of independent disks (RAID).

BACKGROUND

Redundant array of independent disks (RAID) is a data storage virtualization technology, which combines a plurality of physical disk drives into a single logic unit for the purpose of data redundancy backup and/or performance improvement. With RAID 5 as an example, it may include block-level stripes having distributed check information. Upon failure of a single drive, subsequent reads can be calculated from the distributed parity information such that no data is lost. Meanwhile, a spare disk is to be selected to replace a failed disk. All data on the failed disk is to be rebuilt and written into the spare disk. In conventional RAID, a RAID group (RG) will consume all disk space in the group, which adversely influences effects and costs of failure rebuilding.

SUMMARY

Embodiments of the present disclosure aim to provide a solution for improving RAID rebuilding performance.

In a first aspect of the present disclosure, there is provided a computer-implemented method. The method comprises: determining a spare redundant array of independent disks (RAID) group with spare capacity from a plurality of disks included in at least one RAID group of a storage pool; building a spare logic unit from the spare RAID group; and in response to one of the at least one RAID group of the storage pool in a degradation status, rebuilding a failed disk in a degraded RAID group using the spare logic unit.

In some embodiments, determining the spare RAID group with the spare capacity comprises: determining, based on a correspondence between the number of disks in the storage pool and the number of spare disks, allocation of spare capacity in the plurality of disks.

In some embodiments, building the spare logic units from the spare RAID group comprises: determining, based on a size of the spare capacity, the number of spare logic units built from the spare RAID group.

In some embodiments, rebuilding the failed disk in the degraded RAID group using the spare logic unit comprises: detecting whether the spare logic units are available; in response to availability of the spare logic unit, assigning the spare logic units to the degraded RAID group; and in response to initiating a rebuilding action by the degraded RAID group, writing data in the failed disk into the spare logic unit.

In some embodiments, the method further comprises: releasing the spare logic units after the failed disk is replaced.

In some embodiments, releasing the spare logic units comprises: in response to the replacement of the failed disk, writing data of the failed disk written in the spare logic units back to a replacement disk; removing the spare logic unit from the degraded RAID group; and adding the replacement disk into the degraded RAID group.

In a second aspect of the present disclosure, there is provided a computer-implemented apparatus. The apparatus comprises at least one processing unit and at least one memory. The memory is coupled to the at least one processing unit and stored with instructions thereon. When the instructions is executed by the at least one processing unit, the apparatus performs acts including: determining a spare redundant array of independent disks (RAID) group with spare capacity from a plurality of disks included in at least one RAID group of a storage pool; building a spare logic unit from the spare RAID group; and in response to one of the at least one RAID group of the storage pool being in a degraded status, rebuilding a failed disk in the degraded RAID group using the spare logic unit.

In a third aspect of the present disclosure, there is provided a computer program product being tangibly stored in a non-transient computer-readable medium and including computer-readable program instructions, which, when executed on a device, cause the device to perform steps of the method described according to the first aspect.

Compared with the prior art, the embodiments of the present disclosure can significantly improve rebuilding performance of conventional RAID. Besides, all disks in the storage pool are available for user IO due to the cancellation of dedicated spare disks in the storage pool, which further improves effective rate of the disk. Management of distributed spare disk space by RAID groups of RAID-X0 type can distribute write IO to all disks in the storage pool during rebuilding period. The rebuilding method of embodiments of the present disclosure can be implemented based on conventional RAID technology.

The Summary is provided to introduce the selections of concepts in a simplified way, which will be further explained in the following detailed descriptions of the embodiments. The Summary bears no intention of identifying key or vital features of the present disclosure or limiting the scope of the present disclosure.

BRIEF DESCRIPTION OF THE DRAWINGS

Through the following detailed description with reference to the accompanying drawings, the above and other objectives, features, and advantages of example embodiments of the present disclosure will become more apparent. In the drawings, several example embodiments of the present disclosure will be illustrated by way of example but not limitation, in which.

In each drawing, the same or corresponding reference signs indicate the same or corresponding parts.

DETAILED DESCRIPTION OF EMBODIMENTS

Figure 1:
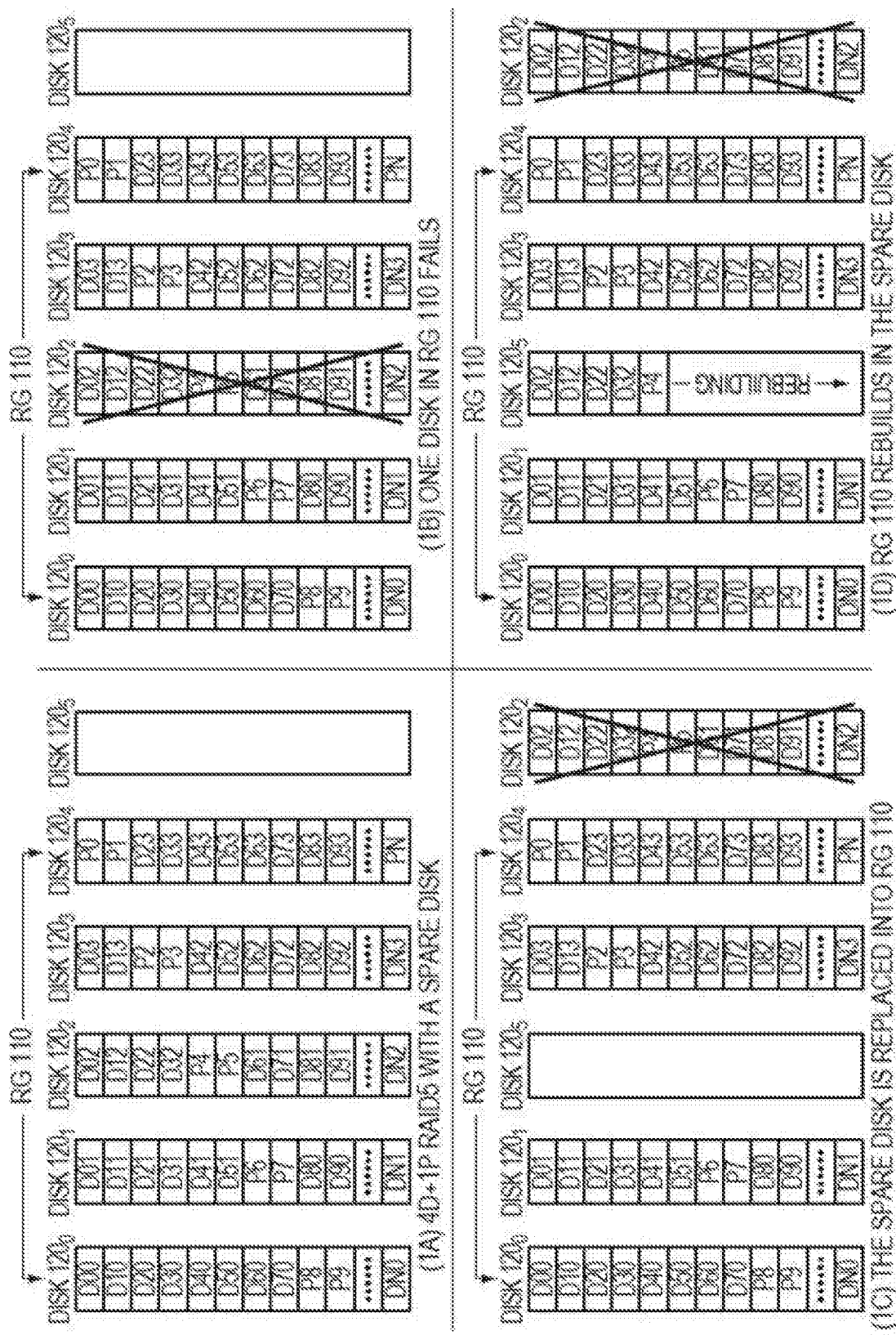
FIG. 1 illustrates a schematic diagram of rebuilding a conventional RAID.

In the following text, each example embodiment of the present disclosure will be described with reference to the drawings. It should be noted that the drawings and descriptions only involve exemplary embodiments. Besides, it should be appreciated that the alternative embodiments of structures and methods disclosed here can be easily contemplated according to the subsequent description. The alternative embodiments can be employed without deviating from the principle protected by the present disclosure.

It should be understood that the exemplary embodiments are merely to enable those skilled in the art to better understand and further implement the present disclosure and are not intended to limit the scope disclosed herein in any manner.

As used herein, the terms "comprise," "include" and their variants are to be read as open-ended terms that mean "comprise/includes, but is not limited to." The term "based on" is to be read as "based at least in part on." The term "one example embodiment" is to be read as "at least one example embodiment." The term "a further embodiment" is to be read as "at least one further embodiment." Relevant definitions of other technical terms will be present in the following description.

In the following text, a solution for evaluating rebuilding performance of RAID according to embodiments of the present disclosure will be explained in details with reference to the drawings. To facilitate the description, a RAID 5 having 4 data blocks and 1 parity block (4D+1P) is used as an example to elaborate embodiments of the present disclosure. However, it should be understood that principle and method of embodiments of the present disclosure can be applied to RAID at any levels or layouts, and are not limited to the examples listed below. Moreover, the protection scope of the present disclosure is not limited in this regard.

As stated above, in conventional RAID, RAID group (RG) will consume all disk space in the group. Through study of inventors, it is discovered that the conventional solution will lead to following problems. First, if a single disk fails, the rebuilding write input and output (IO) will target to the only one disk spared in. Thus, the bandwidth of the spare disk will be the bottleneck of rebuilding performance. Moreover, spindle disk has different read/write IO performance; and the bandwidths for serving read IO or write IO are also different. Second, user IOs targeting to the same RG will also be affected significantly. Response time of those user IOs will be enlarged significantly, since the IO performance of RG is limited by the slowest disk in the RAID group. Further, in the rebuilding case, the disk under rebuilding will limit user IO performance. Third, specific user IO process is needed when RAID group is under rebuilding. For example, the failure of other disks during rebuilding will cause data loss. Moreover, the specific user IO process will degrade the user IO performance significantly. Furthermore, as disk capacity is increased year by year, the above issues are amplified, which exposes users to a greater risk of data loss.

FIG. 1 illustrates a schematic diagram of rebuilding a conventional RAID. The conventional RAID consists of block-level striping having distributed check information. The check information may be distributed among a plurality of disks. FIG. 1 illustrates RG 110, which is a RAID 5 with 4 data blocks and 1 parity block (4D+1P). As shown in FIG. 1 (1A), RG 110 uses 5 disks, which are disk $120_0$, disk $120_1$, disk $120_2$, disk $120_3$ and disk $120_4$, respectively. In addition, RG 110 uses disk $120_5$ as its spare disk. Each stripe of RG 110 may comprise 5 blocks formed by 4 data blocks (i.e., blocks storing D00, D01, . . . DN3) and 1 parity block (i.e., blocks storing P0, P1, . . . PN). FIG. 1 (1B) illustrates that one disk (e.g., disk $120_2$) in RG 110 fails. At this time, as shown in FIG. 1 (1C), the spare disk (e.g., disk $120_5$) will replace the failed disk (i.e., disk $120_2$); and as shown to FIG. 1 (1D), all data on the failed disk (i.e., disk $120_2$) will be rebuilt and written into the spare disk (e.g., disk $120_5$).

Figure 2:
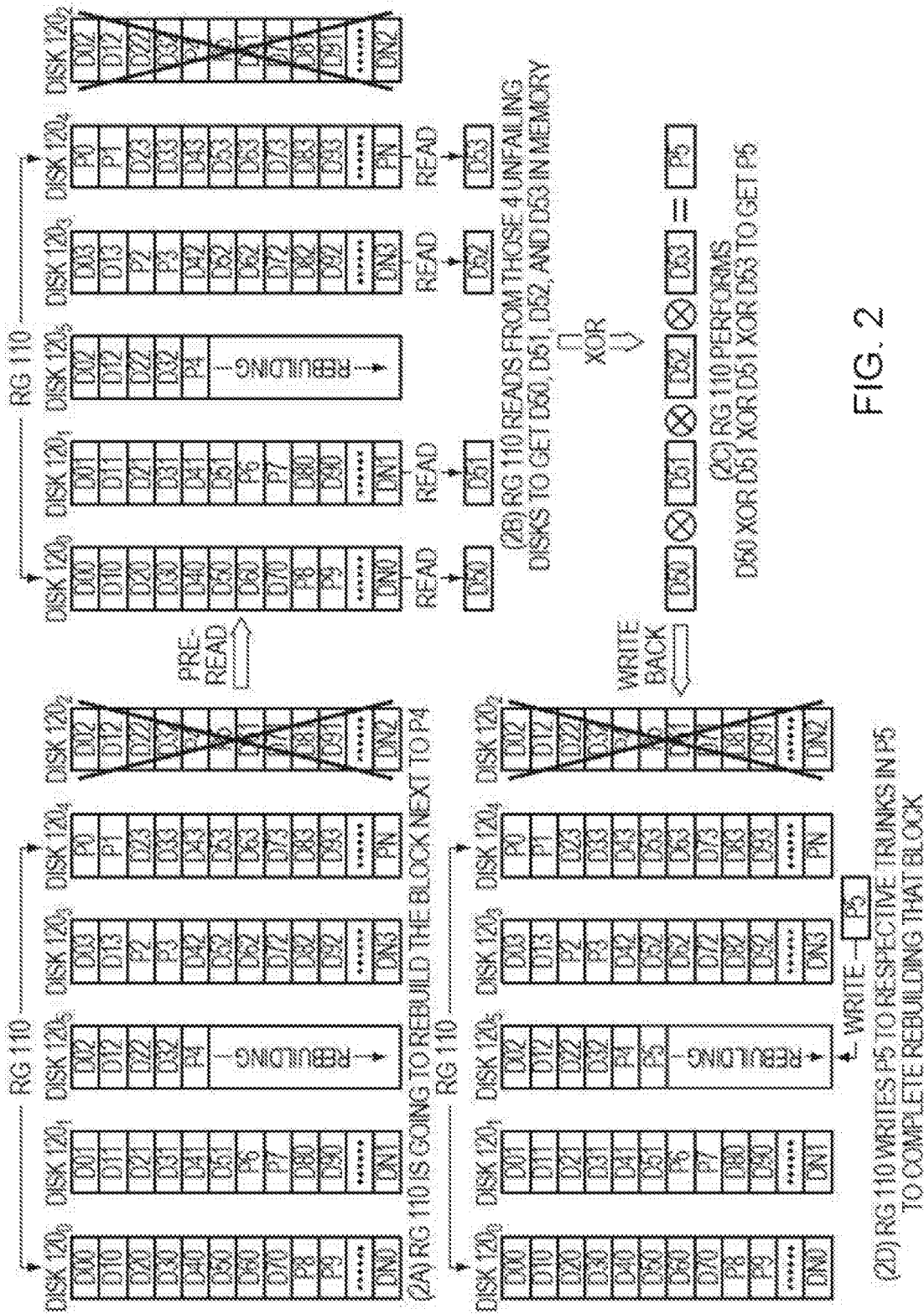
FIG. 2 illustrates a schematic diagram of internal actions for rebuilding a conventional RAID.

Furthermore, FIG. 2 illustrates a schematic diagram of internal actions of RG 110 for rebuilding as shown in FIG. 1. The internal actions for rebuilding may comprise three steps: backup in the disk, pre-read, exclusive or (XOR) and write back. As already described with reference to FIG. 1, the disk $120_2$ in RG 110 fails, and all data on the disk $120_2$ is to be rebuilt and written into the disk $120_5$ (i.e., the spare disk). For example, as illustrated in FIG. 2 (2A), RG 110 will rebuild blocks subsequent to P4. The first step is pre-reading, as shown in FIG. 2 (2B), in which RG 110 respectively reads, from 4 unfailing disks (i.e., disk $120_0$, disk $120_1$, disk $120_3$, and disk $120_4$), data D50, D51, D52, and D53 in the same stripe. The next step is XOR, as illustrated in FIG. 2 (2C), in which RG 110 performs XOR operation on the read data to obtain data stored in corresponding blocks of the failed disk (e.g., D50 XOR D51 XOR D52 XOR D53=P5). The final step is write back, as shown in FIG. 2 (2D), in which RG 110 writes results of the exclusive-or operation (e.g., P5) into respective blocks of the spare disk to complete rebuilding the block.

Figure 3:
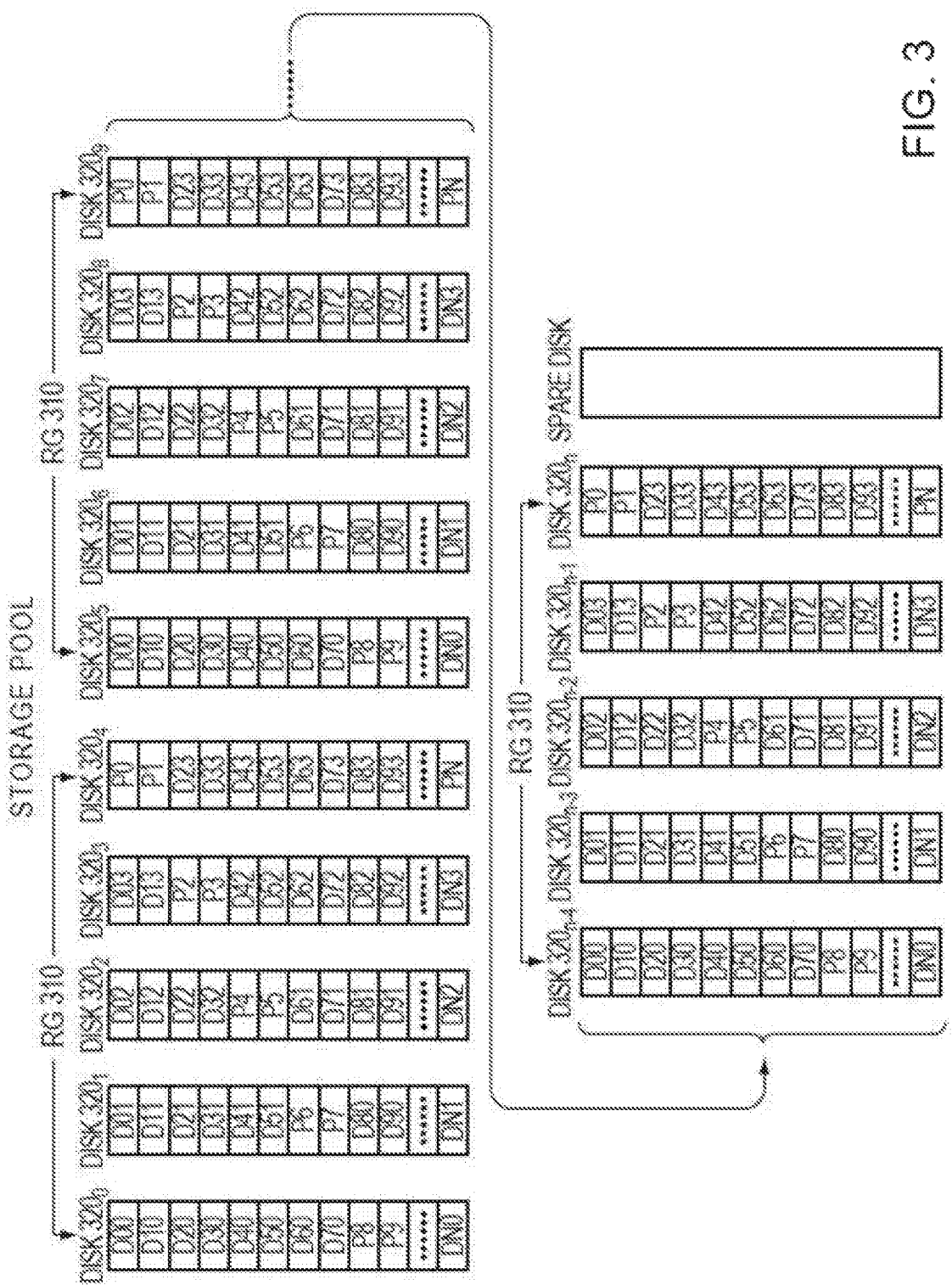
FIG. 3 illustrates a schematic diagram of a storage pool consisting of a plurality of RAID groups and dedicated spare disks according to embodiments of the present invention.

In a storage pool, RG with same RAID type and width (number of disks in the RAID group) are usually connected in series and a component is provided for maintaining the mapping between thin logic unit (Thin LUN) address space and thick logic unit (Thick LUN) address space. Then, slices are initiated/allocated, when necessary, from Thick LUN to Thin LUN. Therefore, in the same storage pool, RAID groups with the same disk technology generally need to have same type and width. A user needs to arrange spare disks for each storage pool or the spare disks can be shared among storage pools. Anyway, the storage pool needs the spare disks in the array. FIG. 3 illustrates a schematic diagram of a storage pool having a plurality of RAID groups and dedicated spare disks according to embodiments of the present invention. As shown in FIG. 3, there are a plurality of RAID groups (i.e., $RG310_1$, $RG310_2$, . . . $RG310_N$) and dedicated spare disks in the storage pool. When one of the RAID groups in the storage pool is under degraded state, the spare disk rebuilds RAID in the degraded RAID group. However, if there are no failed disks in the storage pool, the configuration of dedicated spare disks wastes a customer's resources.

Figure 4:
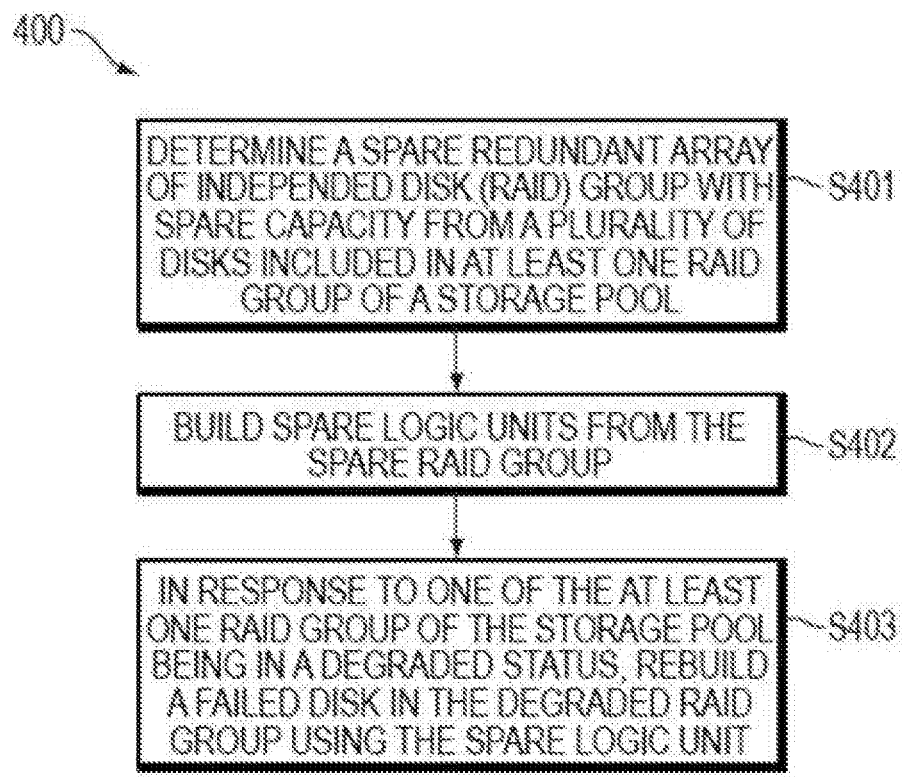
FIG. 4 illustrates a flowchart of a method 400 for rebuilding RAID according to embodiments of the present invention.

Accordingly, a solution that can effectively improve rebuilding performance of the conventional RAID is in need. FIG. 4 illustrates a flowchart of a method 400 for rebuilding RAID according to embodiments of the present invention.

Figure 5:
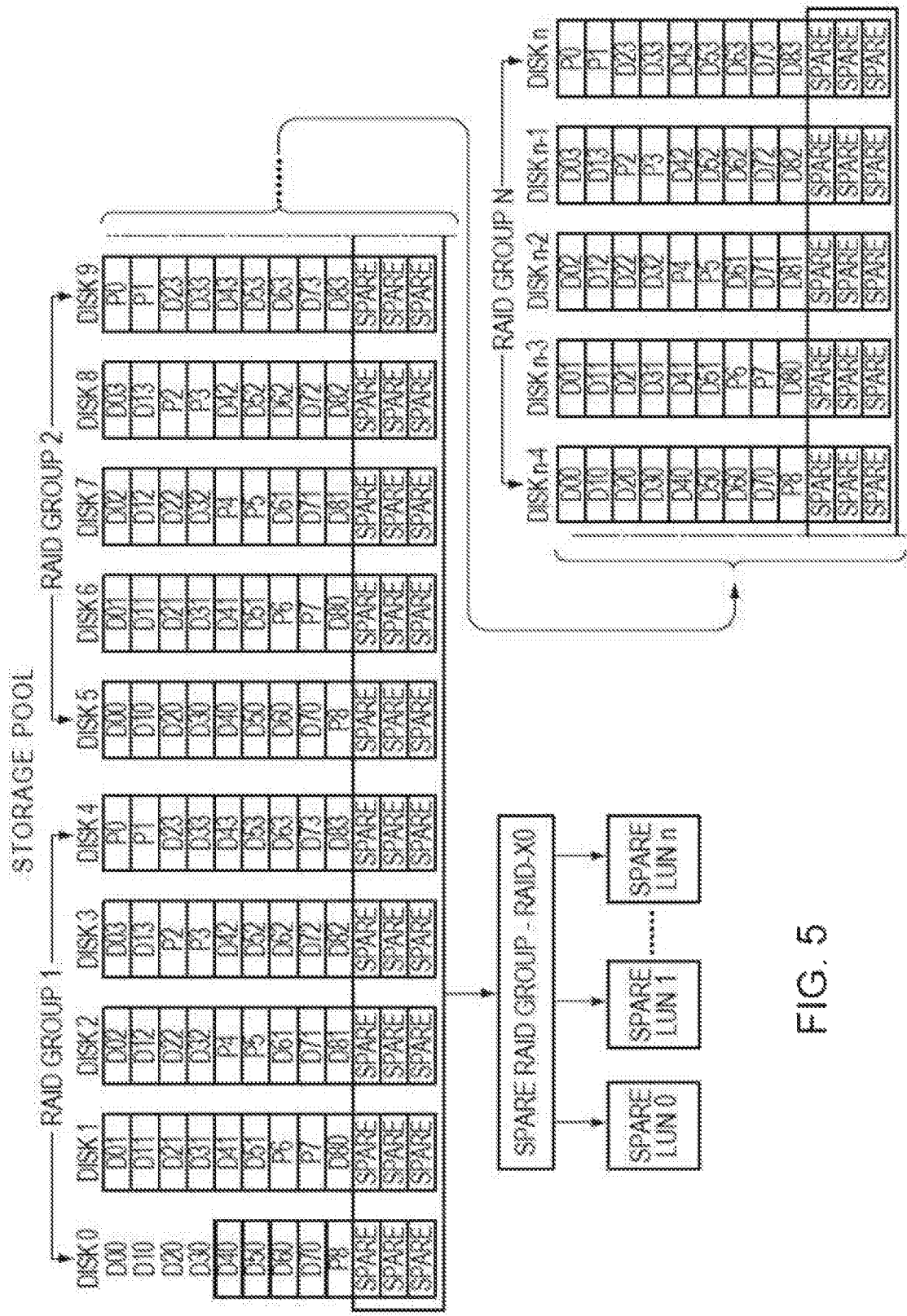
FIG. 5 illustrates a schematic diagram of a storage pool consisting of a plurality of RAID groups and distributed spare disks according to embodiments of the present invention.

At 401, a spare RAID group with spare capacity is determined from a plurality of disks included in at least one RAID group of a storage pool. In some embodiments, allocation of the spare capacity in the plurality of disks can be determined based on correspondence between the number of the disks in the storage pool and the number of spare disks. The method 400 will be elaborated in details with reference to FIG. 5, which illustrates a schematic diagram of a storage pool comprising a plurality of RAID groups and distributed spare disks according to embodiments of the present invention. FIG. 5 illustrates a storage pool that includes a plurality of RAID groups, i.e., RG $510_1$, RG $510_2$ RG $510_N$. The RG $510_1$, for example, is a conventional 4D+1P RAID 5, comprising disk $520_0$, disk $520_1$, disk $520_2$, disk $520_3$, and disk $520_4$. It can be seen that embodiment shown in FIG. 5 cancels the configuration of the dedicated spare disk compared with the embodiment indicated in FIG. 3. Conversely, the spare disk is distributed in each disk of the RAID groups of the storage pool. The size of spare capacity divided from each disk depends on correspondence between the number of disks and the number of spare disks, i.e., the predetermined spare disk ratio. For example, 30 disks to one spare disk. If the storage pool comprises less than 30 disks, a spare disk with capacity of one disk is divided from all disks included in the storage pool. If the storage pool comprises more than 30 but less than 60 disks, a spare disk with capacity of two disks is carved. The divided spare disks form a spare RAID group, i.e., the spare RG in FIG. 5.

It is necessary to note that a RAID group in a storage pool can be provided in the form of RAID-X, e.g., RAID 5 (width of Y) or RAID 6 (width of Z), which is usually predetermined by the user at an initialization phase of the storage pool. A spare RAID group built by the spare disk pieces divided from the RAID groups can be a RAID group in the form of RAID-X0 (width of Y/Z). That is, the spare RAID group can support all conventional types of RAID. Moreover, the spare RG (RAID-X0) can evenly allocate IO across all disks, which usually can allocate the IO to all disks and kilo-bytes granularity.

Although some capacity is divided from each disk in each RAID group of the storage pool to serve as spare disks in the embodiment indicated by FIG. 5, the capacity can also be divided only from a part of the RAID groups in the storage pool to serve as capacity of the spare disks. For instance, only one RAID group in the storage pool is utilized. The embodiment in FIG. 5 merely aims to illustratively demonstrate layout of the distributed spare disk, rather than limiting the layout of the spare disk.

At 420, a spare logic unit is built from the spare RAID group. Therefore, in some embodiments, the number of spare logic units built from the spare RAID group can be determined based on the size of spare capacity. For example, if the capacity of divided spare disk equals to the capacity of one disk, one spare logic unit is built from the spare RG, such as LUN 0. If the capacity of the divided spare disk equals to the capacity of two disks, two spare logic units are built from the spare RG, such as LUN 0 and LUN 1, and so on. As illustrated in FIG. 5, spare logic units LUN 0, LUN 1, ... LUN n are built from the spare RG The spare logic units providing block device access interfaces are actually very similar to physical disks. Moreover, it only requires adding a very thin shim upon these spare logic units to simulate the spare logic units as disks.

At 430, in response to one of the at least one RAID group in the storage pool being under degraded state, the spare logic unit is used to rebuild failed disks in the degraded RAID group. Example implementation of the operation at 430 will be described with reference to FIG. 6, which illustrates a schematic diagram of rebuilding RAID by distributed spare disks according to embodiments of the present invention.

Figure 6:
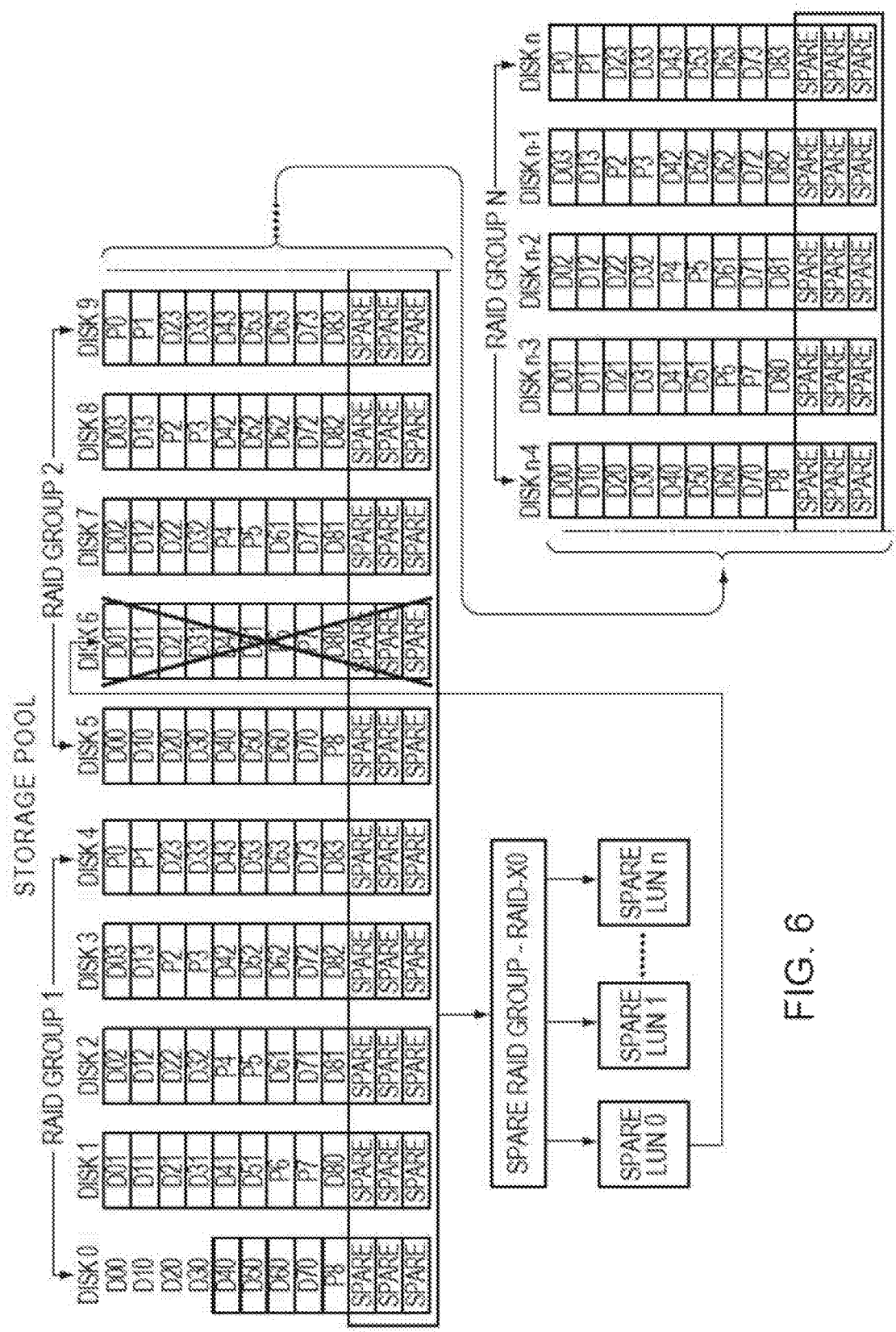
FIG. 6 illustrates s a schematic diagram of rebuilding RAID using distributed spare disks according to embodiments of the present invention.

According to embodiments of the present disclosure, the spare logic unit may be detected for availability. Once the spare logic unit is available, it is designated to the degraded RAID group. If the degraded RAID group initiates rebuilding actions, data in the failed disk will be written into the spare logic unit. For example, in FIG. 6, the failure of disk $520_6$ in RG $510_2$ causes RG $510_2$ being in the degraded status. In this case, for example, the spare logic unit LUN 0 is detected for availability. Once the spare logic unit LUN 0 is determined to be available, it is designated to RG $510_2$ for rebuilding disk $520_6$. When RG $510_2$ initiates rebuilding, data in disk $520_6$ will be written into LUN 0. The rebuilding actions still comprise read, exclusive-or, and write, which is similar to the procedure in FIG. 2 and will not be repeated here. In FIG. 6, because the spare logic unit is built from spare disk RAID (RAID-X0) group, the write IO can be allocated to all disks in the storage pool. Through this variation, rebuilding performance of RAID will be greatly improved.

When the disks in the RAID group malfunction, the customer will receive an alert about replacing the old disk with a new one. However, in practice, no matter how much capacity is configured for spare disks, the number of spare logic units is limited. Therefore, after having rebuilt all data in the failed disk onto the spare logic unit, the failed disk should be replaced. According to embodiments of the present disclosure, the method 400 can also comprise releasing the spare logic units after replacement of the failed disk.

According to embodiments of the present disclosure, if the failed disk is to be replaced, data of the failed disk written into the spare logic unit will be written back to the replacement disk. After write back, the spare logic unit is removed from the degraded RAID group and the replacement disk is incorporated into the degraded RAID group. For example, as illustrated in FIG. 6, if a new disk is inserted to replace the failed disk $520_6$, a copy process needs to be initiated, i.e., copying data on the spare logic unit LUN 0 to the new disk so as to release the spare logic unit LUN 0 for next rebuilding. Although the copy process will take long time, it is not susceptible to a second disk failure in RG $510_2$ since the spare logic unit LUN 0 contains the entire original data. Once the copy from the spare logic unit LUN 0 to the new disk is completed, a simulated disk based on the spare logic unit LUN 0 will be removed from RG $510_2$ and a new disk is incorporated thereinto.

Figure 7:
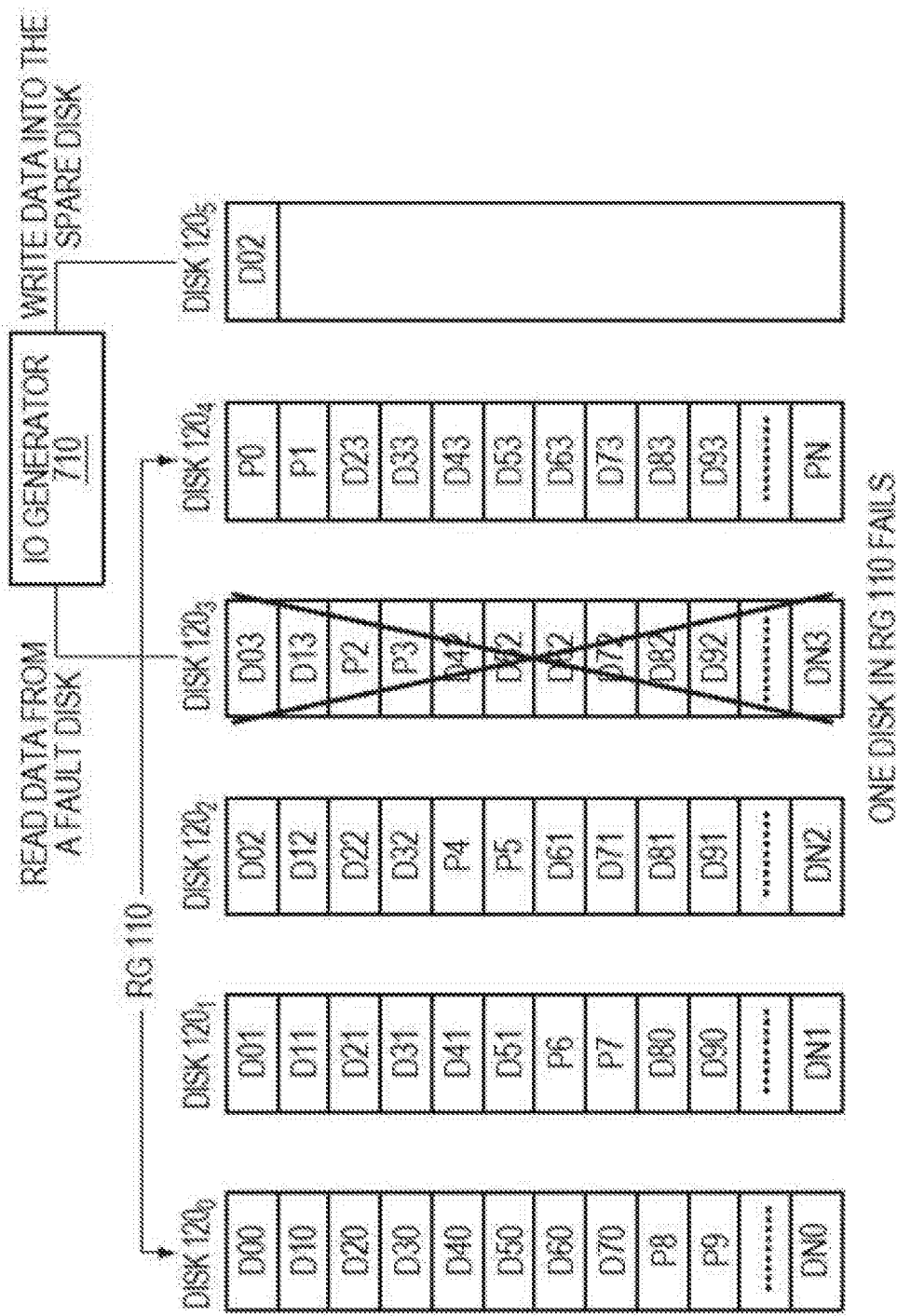
FIG. 7 illustrates a schematic diagram of simulation of a procedure for rebuilding a conventional RAID using IO generators according to embodiments of the present disclosure.

FIG. 7 illustrates a schematic diagram of simulation of a procedure for rebuilding the conventional RAID using IO generators according to embodiments of the present disclosure. RG 110 and IO generator 710 are also demonstrated in FIG. 7. As shown in FIG. 6, the failure of disk $120_2$ in RG 110 causes RG 100 being in the degraded status. IO generator 710 initiates a read request for disk $120_2$ in RG 110. Because RG 110 is in a degraded mode, the read request for failed disk $120_2$ in RG 110 will trigger RG 110 to respectively read corresponding data from other four disks (i.e., disk $120_0$, disk $120_1$, disk $120_3$ and disk $120_4$). Data from the above four disks is performed with the XOR operation to obtain data in the failed disk and the obtained data is returned to the IO generator 710, which will write the acquired data into the disk $120_5$.

The following table lists simulated rebuilding result and real rebuilding result of conventional RAID:

TABLE 1

Simulated Rebuilding Result and Real Rebuilding Result of Conventional RAID

| Column 1 | Total Rebuilding Time (secs) | Capacity Per Disk (MB) | Rebuilding Rate (MB/s) |
|---|---|---|---|
| Simulated Rebuilding | 12000 | 558275 | 37.2 |
| Rebuilding Time on 4 + 1 RAID Group | 15960 | 558275 | 34.9 |

Figure 8:
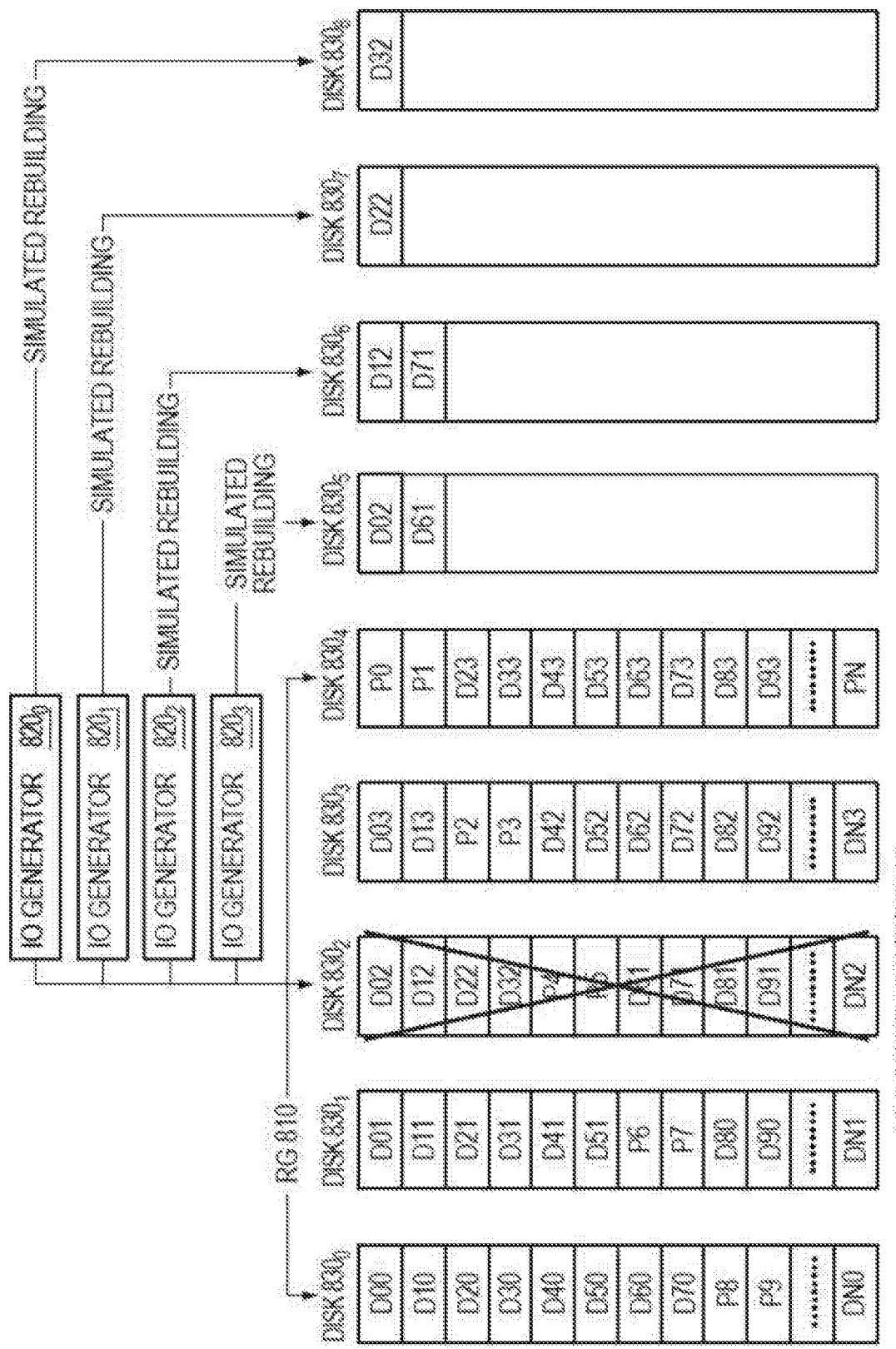
FIG. 8 illustrates a schematic diagram of simulation of a distributed rebuilding procedure using IO generators according to embodiments of the present disclosure.

FIG. 8 illustrates a schematic diagram of simulation of a distributed rebuilding procedure using IO generators according to embodiments of the present disclosure. The rebuilding model here belongs to distributed rebuilding, wherein the degraded disk can be rebuilt into a plurality of disks rather than into a dedicated spare disk in conventional RAID rebuilding. In the rebuilding procedure, pre-read IO will be directed to a specific subset of disks or a designated RAID group, e.g., all pre-read IO is directed to RG $510_2$ as shown in FIG. 6.

Here, the simulation procedure satisfies the following conditions:
Only one source RAID group; all pre-read IO is directed to the RAID; more than one rebuilding target disk;
Measuring the parallel scaling by increasing IO generator threads; and
Measuring the rebuilding ratio scaling by increasing target disks.

FIG. 8 illustrates RG 810, which is a 4D+1P RAID 5 including disks $830_1$, $830_2$ ... $830_4$. RG 810 acts as a source RG used to simulate the rebuilding procedure of RG 710 shown by FIG. 7 and all read requests are directed to RG 810. Additionally, FIG. 8 also illustrates four spare disks $830_5$, $830_6$, $830_7$ and $830_8$ and four IO generators $820_0$, $820_1$, $820_2$ and $820_3$.

First, a disk (e.g., disk $830_2$) in RG 810 breaks down and RG 810 is in degraded status accordingly. Then a read request is initiated via the IO generator to the failed disk $830_2$. Because all write IO load to each disk in the target disks is equal to each other, there is no need to set the whole RAID group as rebuilding target for every rebuilding thread. For example, four IO generators $820_0$, $820_1$, $820_2$ and $820_3$ concurrently issue read requests for 25% of data area of disk $830_2$, such that the write IO load is approximately the same as the simulated mapped RG.

Next, in response to receiving the requested data, the requested data is written into the spare disk by the IO generator. For example, four IO generators $820_0$, $820_1$, $820_2$ and $820_3$ are used to write the requested data into the four spare disks $830_5$, $830_6$, $830_7$ and $830_8$, in parallel, such that the write IO load is approximately the same as the simulated mapped RG.

Through the above model, for example, the number of target disks is increased to eight and/or the IO generator threads are increased to 8. In the above simulation procedure, CPU utilization rate and memory usage do not increase significantly. The following table demonstrates measurement results from the above model:

TABLE 2

Simulated Distributed Rebuilding Results

| | 4 threads 4 spare disks (MB/s) | 8 threads 4 spare disks (MB/s) | 8 threads 8 spare disks (MB/s) |
|---|---|---|---|
| 1 × 6 + 2 R6 RG | 189 | 189 | 224 |

It can seen that rebuilding rate of the simulated distributed rebuild is significantly improved by five to six times compared with the conventional RAID rebuilding method.

Figure 9:
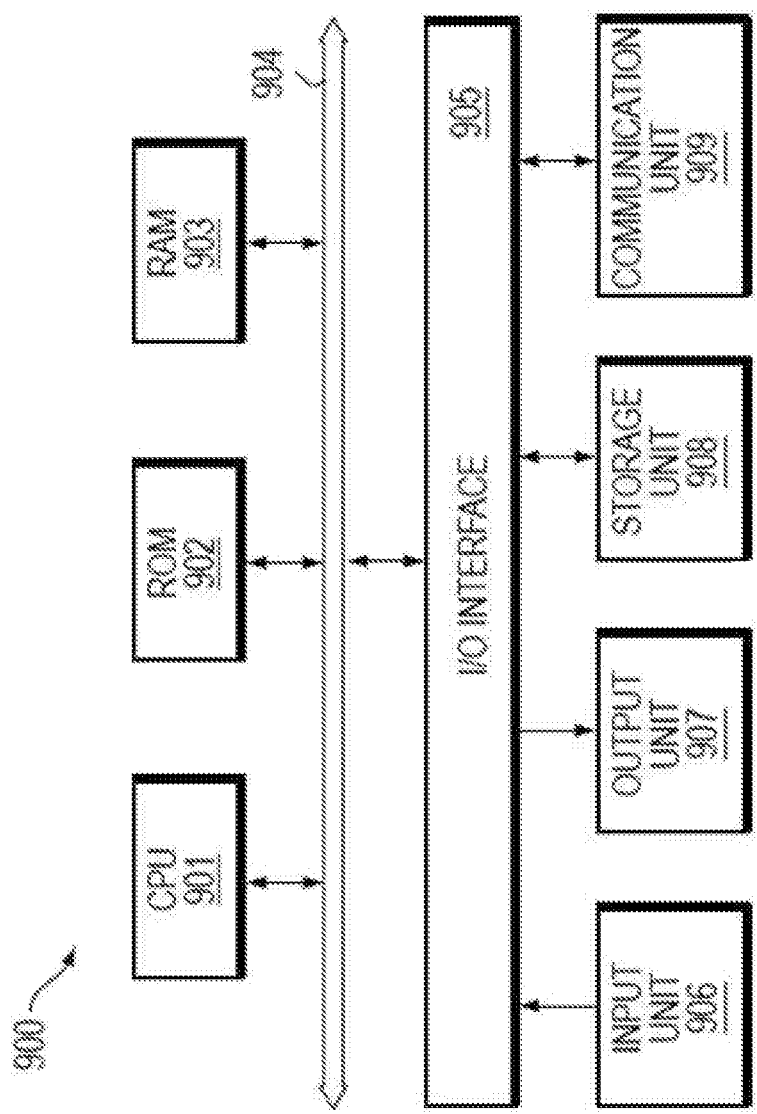
FIG. 9 illustrates a schematic diagram of a device 900 for implementing embodiments of the present disclosure.

FIG. 9 illustrates a schematic diagram of a device 900 for implementing embodiments of the present disclosure. As shown, the device 900 comprises a central processing unit (CPU) 901, which can perform various suitable actions and processing based on computer program instructions stored in the read-only memory (ROM) 902 or loaded into the random-access memory (RAM) 903 from the storage unit 908. The RAM 903 can also store various kinds of programs and data needed by operations of the device 900. CPU 901, ROM 902, and RAM 903 are connected to each other via a bus 904. The input/output (I/O) interface 905 may also be connected to the bus 904.

A plurality of components in the device 900 is connected to the I/O interface 905, comprising: an input unit 906, such as a keyboard, a mouse and the like; an output unit 907, such as displays and loudspeakers of various types etc.; a storage unit 908, such as a magnetic disk, an optical disks and so on; and a communication unit 909, such as a network card, a modem, and a radio communication transceiver. The communication unit 909 allows the device 900 to exchange information/data with other devices via computer networks, such as Internet, and/or various telecommunication networks.

Each procedure and processing described above, e.g., method 400, can be executed by the processing unit 901. For example, in some embodiments, the method 400 can be implemented as computer software program tangibly included in the machine-readable medium, e.g., the storage unit 908. In some embodiments, the computer program is partially or fully loaded and/or installed to the device 900 via the ROM 902 and/or the communication unit 909. When the computer program is loaded to the RAM 903 and executed by the CPU 901, one or more steps of the above described method 400 are performed.

Figure 10:
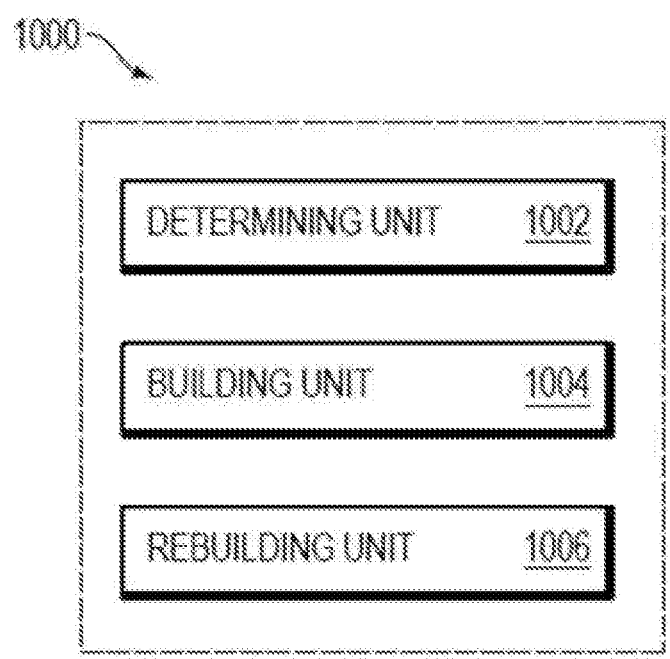
FIG. 10 illustrates an exemplary structural diagram of a device 1000 for RAID rebuilding according to embodiments of the present disclosure.

FIG. 10 illustrates an exemplary structural diagram of a device 1000 for RAID rebuilding according to embodiments of the present disclosure. The device 1000 is operable to execute the method 400 described with reference to FIG. 4, the processing and method described with reference to FIGS. 5 and 6 and any other processing and methods.

For this purpose, the device 1000 comprises: a determining unit 1002 configured to determine a spare RAID group with spare capacity from a plurality of disks included in at least one RAID group of a storage pool; an building unit 1004 configured to establish a spare logic unit from the spare RAID group; and a rebuilding unit 1006 configured to rebuild a failed disk in a degraded RAID group using the spare logic unit in response to one of the at least one RAID group of the storage pool being under a degraded status.

In some embodiments, the determining unit 1002 is also configured to determine, based on correspondence between the number of the disks in the storage pool and the number of spare disks, allocation of spare capacity in the plurality of disks. In some embodiments, the building unit 1004 is also configured to determine, based on a size of the spare capacity, the number of spare logic units built from the spare RAID group. In some embodiments, the rebuilding unit 1006 is also configured to detect whether the spare logic unit is available. When the spare logic unit is available, it is designated to the degraded RAID group. Once the degraded RAID group initiates rebuilding actions, data in the failed disk will be written into the spare logic unit.

In some embodiments, the device 1000 also comprises a releasing unit configured to release a spare logic unit after the failed disk being replaced. The releasing unit is also configured to write data of failed disk written into the spare logic unit back to a replacement disk when the failed disk it replaced. After write back, the spare logic unit is removed from the degraded RAID group and the replacement disk is incorporated into the degraded RAID group.

Units included in the device 1000 can be implemented using various manners, including software, hardware, firmware, and any combinations thereof. In one embodiment, one or more units can be implemented by software and/or firmware, e.g., machine-executable instructions stored on the storage medium. Apart from the machine-executable instructions or as an alternative, units in the device 1000 can be partially or fully implemented by one or more hardware logic components. As an example, instead of limitation, available exemplary types of hardware logic components comprise a field programmable gate array (FPGA), an application-specific integrated circuit (ASIC), an application-specific standard product (ASSP), a system-on-chip (SOP), a complex programmable logic device (CPLD), and so on.

In conclusion, embodiments of the present disclosure provide a solution for improving rebuilding performance of redundant array of independent disks. Compared with the prior art, embodiments of the present disclosure can significantly improve rebuilding performance of conventional RAID. Besides, all disks in the storage pool are available for user IO due to the cancellation of dedicated spare disks in the storage pool, which further improves effective rate of the disk. Management of distributed spare disk space by RAID groups of the RAID-X0 type can distribute write IO to all disks in the storage pool during rebuilding period. The rebuilding method of embodiments of the present disclosure can be implemented based on conventional RAID technology.

The present disclosure can be a method, a device and/or a computer program product. The computer program product can comprise computer-readable storage medium loaded with computer-readable program instructions thereon for executing various aspects of the present disclosure.

The computer-readable storage medium can be a tangible device capable of maintaining and storing instructions used by the instruction executing devices. The computer-readable storage medium may include but is not limited to, for example an electrical storage device, a magnetic storage device, an optical storage device, an electromagnetic storage device, a semiconductor storage device or any suitable combination of the above. More specific examples (non-exhaustive list) of the computer-readable storage medium includes the following: a portable storage disk, a hard disk, a random-access memory (RAM), a read-only memory (ROM), an erasable programmable read-only memory (EPROM or flash), a static random-access memory (SRAM), a portable compact disk read-only memory (CD-ROM), a digital versatile disk (DVD), a memory stick, floppy disk, a mechanic coding device, e.g., a punched card or embossment within a groove stored with instructions thereon, and any suitable combinations of the above. The computer-readable storage medium used herein is not interpreted as transient signal per se, e.g., radio waves or freely propagated electromagnetic waves, electromagnetic waves propagated via waveguide or other transmission medium (e.g., optical pulse through a optic fiber cable), or electric signals transmitted through an electric wire.

Computer-readable program instructions described herein can be downloaded to respective computing/processing device from a computer readable storage medium, or to an external computer or external storage device via networks, e.g., Internet, local area network, wide area network and/or wireless network. The network can comprise copper transmission cables, optic fiber transmission, wireless transmission, routers, firewalls, switches, gateway computers and/or edge servers. The network adapter card or network interface in each computing/processing device receives computer-readable program instructions from the network and forwards the computer-readable program instructions to store in the computer-readable storage medium within the respective computing/processing device.

Computer program instructions for carrying out operations of the present disclosure may be assembly instructions, instructions of instruction set architecture (ISA), machine instructions, machine-related instructions, microcodes, firmware instructions, state setting data, or source codes or target codes written in any combinations of one or more programming languages, wherein the programming languages comprise object-oriented programming languages, e.g., Smalltalk, C++ and so on, and conventional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (for example, via Internet using the Internet service provider). In some embodiments, state information of the computer-readable program instructions is used to customize an electronic circuit, for example, programmable logic circuit, field programmable gate array (FPGA) or programmable logic array (PLA). The electronic circuit can execute computer-readable program instructions to implement various aspects of the present disclosure.

Various aspects of the present disclosure are described herein with reference to flowchart and/or block diagram of method, apparatus (device) and computer program products according to embodiments of the present disclosure. It should be understood that each block of the flowchart and/or block diagram and the combination of each block in the flowchart and/or block diagram can be implemented by computer-readable program instructions.

These computer-readable program instructions may be provided to the processor of general-purpose computer, dedicated computer or other programmable data processing apparatuses to produce a machine, such that the instructions that, when executed by the processor of the computer or other programmable data processing apparatuses, generate an apparatus for implementing functions/actions stipulated in one or more blocks in the flowchart and/or block diagram. The computer-readable program instructions can also be stored in the computer-readable storage medium and cause the computer, programmable data processing apparatus and/or other devices to work in a particular manner, such that the computer-readable medium stored with instructions comprises an article of manufacture, including instructions for implementing various aspects of the functions/actions as specified in one or more blocks of the flowchart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flowchart and/or block diagram.

The flowchart and block diagram in the drawings illustrate architecture, functions and operations implemented by method, device and computer program product according to multiple embodiments of the present disclosure. In this regard, each block in the flowchart or block diagram can represent a module, a part of program segment or instruction, wherein the module and the part of program segment or instruction include one or more executable instructions for performing stipulated logic functions. In some alternative implementations, the functions indicated in the block diagram can also take place in an order different from the one indicated in the drawings. For example, two successive blocks may, in fact, be executed in parallel or in a reverse order dependent on the involved functions. It should also be noted that each block in the block diagram and/or flowchart and combinations of the blocks in the block diagram and/or flowchart can be implemented by a hardware-based system dedicated for executing stipulated functions or actions, or by a combination of dedicated hardware and computer instructions.

The description of various embodiments of the present disclosure have been described above and the above description is only exemplary rather than exhaustive and is not limited to the embodiments of the present disclosure. Many modifications and alterations, without deviating from the scope and spirit of the explained various embodiments, are obvious for those skilled in the art. The selection of technical terms in the text aims to best explain principles and actual applications of each embodiment and technical improvements made in the market by each embodiment, or enable those ordinary skilled in the art to understand the embodiments disclosed herein.

We claim:

1. A computer-implemented method, comprising:
    determining a spare redundant array of independent disks (RAID) group with spare capacity from a plurality of disks included in at least one RAID group of a storage pool;
    building spare logic units from the spare RAID group; and
    in response to a RAID group of the at least one RAID group of the storage pool being in a degradation status, rebuilding a failed disk in the degraded RAID group using the spare logic units,
    wherein the spare logic units are distributed across multiple target disks in the storage pool, and wherein rebuilding the failed disk includes:
        assigning a respective I/O generator to each of the multiple target disks;
        reading, by each I/O generator, respective data of the failed disk from the RAID group being in the degradation status; and
        writing, by each I/O generator, the respective data to the target disk to which the respective I/O generator is assigned,
    wherein each I/O generator runs in a respective thread, wherein writing the data by each I/O generator includes operating the I/O generator threads in parallel to effect writes to the respective target disks in parallel, the multiple target disks including N target disks, the failed disk having a data area, and wherein reading, by each I/O generator, the respective data from the failed disk includes each I/O generator reading substantially 1/N the data area.

2. The method of claim 1, wherein determining the spare RAID group with the spare capacity comprises:
    determining, based on a correspondence between the number of the disks in the storage pool and the number of spare disks, allocation of spare capacity in the plurality of disks.

3. The method of claim 1, wherein building the spare logic units from the spare RAID group comprises:
    determining, based on a size of the spare capacity, the number of spare logic units built from the spare RAID group.

4. The method of claim 1, wherein rebuilding the failed disk in the degraded RAID group using the spare logic units comprises:
    detecting whether the spare logic units are available;
    in response to the spare logic units being available, assigning the spare logic units to the degraded RAID group; and
    in response to the degraded RAID group initiating a rebuilding action, writing data of the failed disk into the spare logic units.

5. The method of claim 1, further comprising:
    releasing the spare logic units after the failed disk is replaced.

6. The method of claim 5, wherein releasing the spare logic units comprises:
    in response to the replacement of the failed disk, writing data of the failed disk written in the spare logic units back to a replacement disk;
    removing the spare logic units from the degraded RAID group; and
    adding the replacement disk into the degraded RAID group.

7. A computer-implemented apparatus, comprising:
    at least one processing unit; and
    at least one memory coupled to the at least one processing unit and having instructions stored thereon which, when executed by the at least one processing unit, cause the apparatus to perform acts including:
        determining a spare redundant array of independent disks (RAID) group with spare capacity from a plurality of disks included in at least one RAID group of a storage pool,
        building spare logic units from the spare RAID group, and
        in response to a RAID group of the at least one RAID group of the storage pool being in a degradation status, rebuilding a failed disk in the degraded RAID group using the spare logic units,
    wherein the spare logic units are distributed across multiple target disks in the storage pool, and wherein rebuilding the failed disk includes:

assigning a respective I/O generator to each of the multiple target disks;

reading, by each I/O generator, respective data of the failed disk from the RAID group being in the degradation status; and writing, by each I/O generator, the respective data to the target disk to which the respective I/O generator is assigned, wherein each I/O generator runs in a respective thread, wherein writing the data by each I/O generator includes operating the I/O generator threads in parallel to effect writes to the respective target disks in parallel, the multiple target disks including N target disks, the failed disk having a data area, and wherein reading, by each I/O generator, the respective data from the failed disk includes each I/O generator reading substantially 1/N the data area.

8. The apparatus of claim 7, wherein determining the spare RAID group with the spare capacity comprises:

determining, based on a correspondence between the number of the disks in the storage pool and the number of spare disks, allocation of spare capacity in the plurality of disks.

9. The apparatus of claim 7, wherein building the spare logic units from the spare RAID group comprises:

determining, based on a size of the spare capacity, the number of spare logic units built from the spare RAID group.

10. The apparatus of claim 7, wherein rebuilding the failed disk in the degraded RAID group using the spare logic units comprises:

detecting whether the spare logic units are available;

in response to availability of the spare logic unit, assigning the spare logic units to the degraded RAID group; and in response to the degraded RAID group initiating a rebuilding action, writing data of the failed disk into the spare logic units.

11. The apparatus of claim 7, wherein the acts further include:

releasing the spare logic units after the failed disk is replaced.

12. The apparatus of claim 11, wherein releasing the spare logic units comprises:

in response to the replacement of the failed disk, writing data of the failed disk written in the spare logic units back to a replacement disk;

removing the spare logic units from the degraded RAID group; and adding the replacement disk into the degraded RAID group.

13. A computer program product, comprising:

a non-transitory computer-readable medium encoded with computer-executable code, the code configured to enable the execution of:

determining a spare redundant array of independent disks (RAID) group with spare capacity from a plurality of disks included in at least one RAID group of a storage pool;

building spare logic units from the spare RAID group; and in response to a RAID group of the at least one RAID group of the storage pool being in a degradation status, rebuilding a failed disk in the degraded RAID group using the spare logic units, wherein the spare logic units are distributed across multiple target disks in the storage pool, and wherein rebuilding the failed disk includes:

assigning a respective I/O generator to each of the multiple target disks;

reading, by each I/O generator, respective data of the failed disk from the RAID group being in the degradation status; and writing, by each I/O generator, the respective data to the target disk to which the respective I/O generator is assigned, wherein each I/O generator runs in a respective thread, wherein writing the data by each I/O generator includes operating the I/O generator threads in parallel to effect writes to the respective target disks in parallel, the multiple target disks including N target disks, the failed disk having a data area, and wherein reading, by each I/O generator, the respective data from the failed disk includes each I/O generator reading substantially 1/N the data area.

14. The computer program product of claim 13, wherein determining the spare RAID group with the spare capacity comprises:

determining, based on a correspondence between the number of the disks in the storage pool and the number of spare disks, allocation of spare capacity in the plurality of disks.

15. The computer program product of claim 13, wherein building the spare logic units from the spare RAID group comprises:

determining, based on a size of the spare capacity, the number of spare logic units built from the spare RAID group.

16. The computer program product of claim 13, wherein rebuilding the failed disk in the degraded RAID group using the spare logic units comprises:

detecting whether the spare logic units are available;

in response to the spare logic units being available, assigning the spare logic units to the degraded RAID group; and in response to the degraded RAID group initiating a rebuilding action, writing data of the failed disk into the spare logic units.

17. The computer program product of claim 13, wherein the code is further configured to enable the execution of:

releasing the spare logic units after the failed disk is replaced.

18. The computer program product of claim 17, wherein releasing the spare logic units comprises:

in response to the replacement of the failed disk, writing data of the failed disk written in the spare logic units back to a replacement disk;

removing the spare logic units from the degraded RAID group; and adding the replacement disk into the degraded RAID group.

* * * * *